(12) United States Patent
Corma Canós et al.

(10) Patent No.: US 7,410,924 B2
(45) Date of Patent: *Aug. 12, 2008

(54) HYDROCRACKING CATALYST COMPRISING A MICROPOROUS CRYSTALLINE SOLID MATERIAL

(75) Inventors: Avelino Corma Canós, Valencia (ES); Agustin Martinez Feliu, Valencia (ES); Fernando Rey García, Valencia (ES); María José Díaz Cabañas, Valencia (ES); Carlos López Cruz, Valencia (ES)

(73) Assignees: Consejo Superior de Investigaciones Cientificas, Serrano, Madrid (ES); Universidad Politecnica de Valencia, Camino de Versa, Valencia (ES)

( * ) Notice: Subject to any disclaimer, the term of this patent is extended or adjusted under 35 U.S.C. 154(b) by 86 days.

This patent is subject to a terminal disclaimer.

(21) Appl. No.: 11/036,964

(22) Filed: Jan. 14, 2005

(65) Prior Publication Data

US 2005/0189259 A1    Sep. 1, 2005

Related U.S. Application Data

(63) Continuation of application No. PCT/ES03/00367, filed on Jul. 15, 2003.

(30) Foreign Application Priority Data

Jul. 16, 2002    (ES) ................................ 200201753

(51) Int. Cl.
    *B01J 29/06* (2006.01)
(52) U.S. Cl. ......................................... 502/64; 502/66
(58) Field of Classification Search ................... 502/64, 502/66
    See application file for complete search history.

(56) References Cited

U.S. PATENT DOCUMENTS

| 3,269,934 | A | 8/1966 | Hansford et al. |
| 3,524,809 | A | 8/1970 | Hansford et al. |
| 6,849,248 | B2 | 2/2005 | Corma Canos et al. |
| 6,998,037 | B2 | 2/2006 | Corma Canos et al. |
| 7,008,612 | B2 * | 3/2006 | Corma Canos et al. ...... 423/718 |
| 2005/0192469 | A1 | 9/2005 | Corma Canos et al. |

FOREIGN PATENT DOCUMENTS

| WO | WO02/092511 | 11/2002 |
| WO | WO03/029387 | 4/2003 |

* cited by examiner

*Primary Examiner*—Elizabeth D Wood
(74) *Attorney, Agent, or Firm*—Klauber & Jackson LLC

(57) ABSTRACT

The invention relates to a hydrocracking catalyst containing: a hydrogenative component which is selected from at least one group VIB metal, at least one group VIII metal and combinations of same; at least one matrix comprising at least one oxide which is selected from an amorphous oxide, an oxide with low crystallinity and a mixture of both; and at least one microporous crystalline solid material which, in the calcined and anhydrous state, has molar composition $X^2O^3$: $nYO^2$:$mZO^2$, wherein X is a trivalent element, Y is at least one tetravalent element that is different from Ge and Z is Ge, and which, im the calcined and anhydrous state, has an X-ray diffractogram containing at least diffraction lines with d values=13.64, 7.87, 4.82, 4.55, 4.11 and 3.41 Å. The invention also relates to the method of preparing the inventive catalyst and to the use of same in hydrocarbon hydrocracking processses.

13 Claims, No Drawings

HYDROCRACKING CATALYST COMPRISING A MICROPOROUS CRYSTALLINE SOLID MATERIAL

This application is a continuation of international application number PCT ES2003/000367 filed Jul. 15, 2003.

TECHNICAL FIELD

The present invention relates to the field of hydrocracking catalysts, more particularly catalysts comprising at least one Group VIB metal, at least one Group VIII metal, a matrix, and a microporous crystalline solid.

BACKGROUND

The hydrocracking of heavy petroleum fractions is of great importance in current refining systems, since it makes it possible to obtain a wide variety of light products such as aviation fuel, medium distillates and light fuel oils from heavier feeds of lower intrinsic value. One advantage of hydrocracking over other conversion processes, such as catalytic cracking, is that it yields medium distillates of excellent quality, whereas the gasoline from hydrocracking usually has a lower octane number than that obtained by catalytic cracking. Furthermore, the great flexibility of hydrocracking means that the production of different fractions can be adapted to market demand.

Conventional hydrocracking catalysts are bifunctional, i.e. they consist of the combination of a hydrogenating function and an acid function. The hydrogenating function arises from the presence in the catalyst of one or more metals in Group VIB of the Periodic Table of the Elements, such as molybdenum or tungsten, or from a combination of one or more Group VIII metals (preferably non-noble metals) such as nickel, cobalt or iron with Group VIB metals. The acid function is generally associated with a porous support with a high specific surface area having surface acidity, such as halogenated alumina, mixed oxides such as amorphous silica-alumina, or zeolites.

Both the selectivity for various products and the activity of a bifunctional hydrocracking catalyst are largely determined by the balance between the hydrogenating function and the acid function. When the acid function is weak and the hydrogenating function is strong, the catalyst is characterized by having low hydrocracking activity, which makes it necessary to work at high (above 400° C.) reaction temperatures or at very low (generally lower than 2 $h^{-1}$) space velocities (volume of feed to be treated per unit volume of catalyst and per hour), and high selectivity for medium distillates. By contrast, when the acid function is strong and the hydrogenating function is weak, the catalyst is characterized by having high hydrocracking activity but low selectivity for medium distillates. A good hydrocracking catalyst must therefore have an appropriate balance between the acid function and the hydrogenating function.

Supports having a low acid function that are currently most used in the formulation of conventional hydrocracking catalysts include, most notably, amorphous silica-alumina. Hydrocracking catalysts based on amorphous silica-alumina have good selectivity for medium distillates but, as stated above, they are characterized by having low activity.

Supports having a stronger acid function include zeolites. Zeolites, specifically zeolite Y with a faujasite structure, are involved in the formulation of new-generation hydrocracking catalysts. Thus, hydrocracking catalysts based on zeolite Y have greater activity than conventional catalysts based on amorphous silica-alumina, although their selectivity for medium distillates is generally lower than that of the latter. Some hydrocracking processes that use zeolite-Y-based catalysts are described, for example, in patents U.S. Pat. No. 3,269,934 and U.S. Pat. No. 3,524,809.

The activity and selectivity of a zeolite-Y-based hydrocracking catalyst can be altered by modifying the acidity of the zeolite, which depends largely on its chemical composition, and more specifically on the ratio between the silicon atoms and aluminum atoms (Si/Al ratio) that determine its crystal structure. It is well known that the presence of an aluminum atom in tetrahedral coordination within the crystalline network of the zeolite generates charge deficiency that is compensated for by a proton, thus giving rise to the formation of a Brönsted acid center. It is therefore possible, in principle, to control the acidity of the zeolite by varying the Si/Al ratio within the network.

Zeolite-Y-based hydrocracking catalysts with a high Al content in the network (low Si/Al ratio) have high activity since they have a greater concentration of Brönsted acid 1 centers. However, these catalysts have low selectivity for medium distillates since the presence of a high number of acid centers promotes secondary cracking reactions promoting the formation of lighter products, such as gases and naphtha. On the other hand, hydrocracking catalysts containing zeolite Y with a low Al content in the network (high Si/Al ratio), and therefore a low acid center concentration, are more selective for medium distillates, although they have lower hydrocracking activity. In order to reduce the Al concentration in the network and to achieve the appropriate range of Si/Al ratios in hydrocracking catalysts, the zeolite Y must undergo post-synthesis treatments to remove aluminum, since this zeolite cannot be synthesized with a high Si/Al ratio. Such aluminum-removing treatments generally require severe hydrothermal conditions that result in a partial loss of zeolite crystallinity.

It would therefore be highly desirable to have a hydrocracking catalyst with good activity and selectivity for medium distillates, based on a microporous crystalline solid with a topology such that it has cavities with a high volume similar to that of large-pore zeolites, like zeolite Y, and which can be obtained with a high Si/Al ratio in a single synthesis step, avoiding subsequent aluminum-removing processes.

The microporous crystalline solid known as ITQ-21 is described in Spanish patent application P200101145, which corresponds to PCT Publication No.WO02/092511, that entered U.S. national chase on Nov. 14, 2003 as U.S. Ser. No. 10/714,571, and issued as U.S. Pat. No. 6,849,248 on Feb. 1, 2005. However, its use as a hydrocracking catalyst component is neither suggested nor described in said application. Spanish application P20012287, which corresponds to PCT Publication No. WO03/029387, that entered U.S. national phase on Apr. 2. 2003 as U.S. Ser. No. 10/817,772, and issued as U.S. Pat. No. 6,998,037 on Feb. 14. 2006, also relates to said crystalline solid material, specifically to its use in cracking. However, this application does not describe its use as a hydrocracking catalyst component in conjunction with Group VIB or VIII metals.

DESCRIPTION OF THE INVENTION

The present invention relates to a hydrocracking catalyst containing:

a hydrogenating component which is selected from at least one Group VIB metal, at least one Group VIII metal, and combinations thereof, at least one matrix comprising at least one oxide which is selected from an amorphous oxide, an oxide with low crystallinity, and a mixture of both, and at least one microporous crystalline solid material which, in the calcined and anhydrous state, has the molar composition $X_2O_3:nYO_2:mZO_2$ in which X is a trivalent element, Y is at least one tetravalent element other than Ge, and Z is Ge, the value (n+m) is at least 5, and may be between 5 and ∞, and the value of n/m is at least 1, and which has, in its calcined and anhydrous state, an X-ray diffractogram containing at least diffraction lines with values of d=13.64, 7.87, 4.82, 4.55, 4.11 and 3.41 Å.

As defined above, the hydrocracking catalyst of the present invention comprises a hydrogenating component that is at least one metal from among the metals of Groups VIB and VIII of the Periodic Table. The Group VIB element can be chromium, molybdenum, tungsten, or mixtures thereof. In a preferred embodiment of the present invention, the Group VIB element is selected from between molybdenum and tungsten.

The Group VIII element can be any of iron, ruthenium, osmium, cobalt, rhodium, iridium, nickel, palladium, platinum, and mixtures thereof. Among the Group VIII metals, preference is given to non-noble metals, preferably iron, cobalt and nickel. Particularly preferably, the hydrogenating component of the catalyst consists of the combination of at least one non-noble metal in Group VIII and at least one metal in Group VIB, The preferred combinations are: nickel-molybdenum, cobalt-molybdenum and nickel-tungsten, although combinations of three elements, such as nickel-cobalt-molybdenum, can optionally be used.

The Group VIII and Group VIB metals can be totally or partially in metal form and/or oxide form and/or sulfide form.

The second essential component of the catalyst is the microporous crystalline solid material which has, in its calcined and anhydrous state, a molar composition of:

$X_2O_3:nYO_2:mZO_2$ in which, preferably, the trivalent element X is Al, B, Fe, In, Ga, Cr or mixtures thereof, preferably Al. Y is preferably a tetravalent element such as Si, Ti, Sn or mixtures thereof, although Si is preferred.

The crystalline solid material also has, both in its calcined form and when synthesized without calcination, an X-ray diffraction pattern that is different than that of other, known crystalline solid materials, and whose major diffraction lines are given in Table 1 (calcined form) and Table 2 (uncalcined form). It should be borne in mind that the exact position of the diffraction peaks will depend on factors such as the chemical composition and crystal size of the material, among other things.

TABLE 1

| d(±0.3 Å) | Relative Intensity |
|---|---|
| 13.64 | vs |
| 7.87 | vs |
| 4.82 | w |
| 4.55 | m |
| 4.11 | m |
| 3.41 | m |

TABLE 2

| d(±0.3 Å) | Relative Intensity |
|---|---|
| 13.77 | vs |
| 7.96 | m |
| 4.88 | m |
| 4.60 | s |
| 4.16 | m |
| 3.45 | s |

These diffractograms were obtained with a Philips X'Pert diffractometer equipped with a graphite monochromator and an automatic divergence slit using copper Kα, radiation. The diffraction data were recorded with a 2θ step size of 0.01°, in which θ is the Bragg angle, and a count time of 10 seconds per step. The interplanar spacing, d, was calculated in angstrom and the relative intensity of the lines was calculated as a percentage of the most intense peak, with 80-100 being considered very strong (vs), 60-80 strong (s), 40-60 medium (m), 20-40 weak (w), and 0-20 very weak (vw).

It should be borne in mind that the diffraction data printed out for this sample as simple or single lines can be formed by multiple overlaps or superposition of reflections that, in certain conditions, such as in the; event of differences in crystallographic changes, may appear as resolved or partially resolved lines. Generally, crystallographic changes can include slight variations in the unit cell parameters and/or changes in crystal symmetry, without this causing a change in the connectivity between the atoms of the structure. These changes, which also include changes in relative intensities, can also be due to differences in the type and quantity of compensation cations, network composition, crystal size and shape, preferred orientation, or to the type of thermal or hydrothermal treatments applied.

The crystalline solid material has a large pore volume and a pore diameter, measured by Ar adsorption, which corresponds to that of a large-pore zeolite. In addition, this material can be synthesized directly with the appropriate Si/Al ratio without the need for post-synthesis processes to remove aluminum.

The third component of the catalyst of the present invention is a matrix, as defined above. Said matrix is preferably selected from among one or more of the following groups: alumina, silica-alumina, silica, clays, magnesium oxide, titanium oxide, boron oxide, zirconium oxide, aluminum phosphates, zirconium phosphates, carbon, and aluminates. The matrix is preferably composed of an amorphous inorganic oxide containing some form of alumina, and, more specifically, gamma-alumina is preferred.

The catalyst of the present invention can contain, in addition to the three essential components, at least one acidity-promoting element, preferably selected from among phosphorus and boron.

The catalyst of the present invention can optionally comprise at least one Group VITA element. The Group VIIA element is preferably fluorine.

In a preferred embodiment, the catalyst of the present invention has a composition, expressed as % by weight of the total weight of the catalyst, corresponding to:

0.1 to 60% of a hydrogenating component selected from at least one Group VIB metal, at least one Group VIII metal, and combinations thereof, preferably 0.1 to 50%, and more preferably 0.1 to 40%, 0.1 to 99% of crystalline acid solid material, preferably 0.1 to 80%, and more preferably 0.1 to 60%, and 0.1 to 99% of at least one matrix, preferably 0.1 to 98%.

If the catalyst additionally comprises a promoter element selected from between phosphorus and boron, said promoter element can be present in a proportion of:

0 to 20% by weight of the total weight of the catalyst.

In a particular embodiment, in which the catalyst comprises at least one Group VIIA element, said element can be present in the catalyst in a proportion of:

0 to 20% by weight of the total weight of the catalyst.

According to a preferred embodiment of the present invention, the Group VIIA element is fluorine, and it is present in the catalyst in a proportion of 0 to 20% by weight of the total weight of the catalyst.

The present invention also relates to a process for the preparation of a catalyst as defined above, which comprises at least 1) a step of preparing the microporous crystalline solid, and a second step selected from among:

2a) incorporation of the hydrogenating component into a mixture of the matrix and the microporous crystalline solid, and 2b) incorporation of the hydrogenating component directly into the matrix before mixing with the crystalline acid solid.

In the step of preparing the microporous crystalline solid, the latter can be prepared from a reaction mixture containing $H_2O$, optionally an oxide or another source of the trivalent element X, such as Al and/or B for example, an oxide or another source of the tetravalent element or elements Y, such as Si for example, a source of Ge, Z, such as $GeO_2$ for example, and an organic structure directing agent (R). The structure directing agent is preferably N(16)-methylsparteinium hydroxide.

In addition, fluorides, more specifically HF, or $OH^-$ groups can be used as mobilizing agents for the silica and the germanium oxide.

If fluorides are used as mobilizing agent, organic molecules and fluoride ions are occluded within the structure, which can be removed by conventional means. Thus, the organic component can be removed, for example by extraction and/or by heat treatment with heating to a temperature above 250° C. for a time of between 2 minutes and 25 hours.

In order to generate acid centers that are active in hydrocracking reactions, the crystalline solid material is preferably synthesized in the presence of an oxide or another source of a trivalent element, such as B and/or Al, preferably Al.

The reaction mixture has the following composition in terms of oxide molar ratios:

| Reagents | Useable |
| --- | --- |
| $(YO_2 + ZO_2)/X_2O_3$ | greater than 5 |
| $H_2O/(YO_2 + ZO_2)$ | 1–50 |
| $R/(YO_2 + ZO_2)$ | 0.1–3.0 |
| $F/(YO_2 + ZO_2)$ | 0.1–3.0 |
| $YO_2/ZO_2$ | greater than 1 |

The microporous crystalline solid material can be crystallized with or without stirring, in autoclaves at a temperature of between 80 and 200° C., for times sufficient to obtain crystallization, for example between 12 hours and 30 days.

It should be borne in mind that the components of the synthesis mixture can come from various sources and, depending on these sources, the crystallization times and conditions can vary. To facilitate synthesis, crystals of previously synthesized microporous material can be added to the synthesis mixture as seeds, in quantities of up to 15% by weight of the total weight of oxides. These seeds can be added before or during the crystallization of the material.

At the end of the crystallization step, the solid crystals are separated from the mother liquors and recovered.

The compensation cations in the crystalline solid material in uncalcined form, or following heat treatment, can be exchanged, if they are present, with other cations such as metal ions, $H^+$ and $H^+$ precursors, such as $NH^+_4$, for example. Among the cations that can be introduced by ion exchange, preference is given to those that can play a positive role in the activity of the material as a catalyst, more specifically cations such as $H^+$, cations of rare earths and Group VIII metals, and metals of Groups IIA, IIIA, IVA, VA, IB, IIB, IIIB, IVB, VB, VIIB of the Periodic Table of the Elements.

The preferred form of the crystalline solid material for its application as acid component of a hydrocracking catalyst is the protonic (acid) form. Optionally, the crystalline solid material can be subjected to calcination in the presence of steam and/or a mixture of steam and air or any of its components, at temperatures of between 200 and 700° C., for a time of between 10 minutes and 5 hours.

According to the second step of the process for preparing the catalyst, the hydrogenating component can be incorporated in various alternate ways.

According to step 2a) defined above, the hydrogenating component can be incorporated into a mixture of the matrix and the microporous crystalline solid.

According to step 2b) defined above, the hydrogenating component can be incorporated directly into the matrix before mixing with the crystalline acid solid.

The hydrogenating component can be incorporated in one or more ion exchange steps if it is incorporated, into the mixture of the crystalline acid solid and the matrix.

The hydrogenation component can be incorporated by impregnation, both if it is incorporated directly into the matrix and if it is incorporated into the matrix/crystalline solid mixture. Impregnation can be carried out in one or more steps starting from a solution containing at least one precursor of at least one oxide of at least one metal among those making up Groups VIB and VIII of the Periodic Table. When the hydrogenating component is formed of the combination of at least one Group VIB element and at least one Group VIII element, the precursor(s) of the oxide(s) of the Group VIII element(s) is(are) preferably impregnated after, or at the same time as, the impregnation of the precursor(s) of the oxide(s) of the Group VIB element(s).

These elements can be impregnated by means of the pore volume method, also known as "dry" impregnation, in which the volume of the pores of the solid to be impregnated is filled with a solution containing at least one precursor of at least one of the Group VIB and Group VIII metals. The impregnation can also be carried out with an excess of a solution containing at least one precursor of at least one of the Group VIB and Group VIII metals. In this case, the excess of solvent is removed slowly by evaporation under controlled conditions.

If these elements are incorporated in various impregnation stages, it is preferable to carry out an intermediate calcination step between each impregnation at a temperature of between 150° C. and 800° C.

Various precursors can be used for the Group VIB elements. For example, and without this implying any limitation on the scope of this invention, in the case of molybdenum and tungsten various oxides and salts can be used, such as ammonium molybdate, ammonium heptamolybdate, and ammonium tungstenate.

As sources of Group VIII elements, typically, the corresponding nitrates, sulfates, and halides are usually used.

If the catalyst contains at least one promoter element, such as phosphorus and/or boron, and at least one Group VIIA element, such as fluorine, these can be incorporated at any time in the preparation of the catalyst, preferably in the support that already contains the crystalline solid material and the matrix. It is also possible to incorporate the promoter and Group VIIA element(s) into the matrix, with subsequent mixing with the crystalline solid.

These elements can be incorporated by means of any known method, although impregnation is preferred, both pore volume impregnation ("dry" impregnation) or with excess of solvent.

As source of phosphorus, orthophosphoric acid ($H_3PO_4$) is preferred, although any of its salts and esters, such as ammonium phosphates, can also be used.

As source of Group VIIA element, any of those well known to those skilled in the art can be used. For example, in the case of fluorine, hydrofluoric acid or a salt thereof may be used. It is also possible to use fluorine compounds that can give rise to the formation of fluoride by hydrolysis in the presence of water, such as ammonium fluorosilicate (($NH4)_2SiF_6$), silicon tetrafluoride ($SiF_4$) or sodium tetrafluoride ($Na_2SiF_6$). The fluoride can be incorporated into the catalyst, for example, by impregnation from aqueous hydrofluoric acid solution or ammonium fluoride.

As the final stage in the preparation of the catalyst, calcination is carried out at temperatures of between 150° C. and 800° C.

The catalyst of the present invention is preferably subjected to a sulfurization step prior to coming into contact with the feed in order to transform, at least partially, the Group VIB and VIII metals into the corresponding sulfides. The sulfurization can be carried out by any of the methods described in the literature.

A typical sulfurization method consists in heating the catalyst in the presence of a stream of pure hydrogen sulfide or a mixture of hydrogen sulfide and hydrogen, or a stream containing hydrogen and liquid hydrocarbons that in turn contain at least one sulfur-containing compound in their composition. The sulfurization is preferably carried out at a temperature of between 150 and 800° C. This process is generally carried out in a continuous fixed bed reactor.

The present invention also relates to the use of the catalyst defined above in the hydrocracking of a feed composed of hydrocarbons. Said hydrocarbon feed can optionally contain sulfur and nitrogen in the form of organic compounds, together with metals and oxygenated compounds. If the content of these compounds is high, the feed can be subjected to a hydrotreatment prior to the hydrocracking in order to reduce the concentration of said compounds to levels that are not detrimental to the catalyst of the invention.

The catalyst can be used for hydrocracking heavy hydrocarbon fractions. These fractions can be of various origins, such as vacuum gasoil for example. In general, these fractions contain at least 80% by volume of compounds with boiling points above 350° C., and preferably between 350° C. and 580° C. These fractions generally contain heteroatoms, such as sulfur and nitrogen. The nitrogen content is usually between 1 and 5000 ppm (by weight) and the sulfur content is usually between 0.01 and 5% by weight. Optionally, these fractions can be subjected to a hydrotreatment prior to hydrocracking in order to reduce the heteroatom concentration or to remove any contaminating metals they may contain.

The catalyst for hydrocracking hydrocarbon feeds of the present invention has high activity and selectivity for medium distillates.

According to the present invention, the hydrocarbon feed is brought into contact with the hydrocracking catalyst in the presence of hydrogen, generally in a fixed bed reactor. The hydrocracking conditions can vary depending on the nature of the feed, the quality of the desired products, end of the particular facilities at each refinery. Generally, the temperature is usually above 200° C., often between 250° C. and 480° C. The pressure is usually greater than 0.1 MPa, often greater than 1 MPa. The $H_2$/hydrocarbon ratio is usually above 50 and generally between 80 and 5000 $Nm^3$ of $H_2$ per $m^3$ of feed. The space velocity (LHSV) is generally between 0.01 and 20 volumes of feed per volume of catalyst per hour. Preferably, the hydrocracking is carried out at temperatures of between 300° C. and 500° C., pressures of between 5 and 20 MPa, $H_2$/hydrocarbon ratios of between 200 and 1500 $Nm^3/m^3$, and LHSVs of between 0.05 and 5 $h^{-1}$.

EXAMPLES

The invention is illustrated below with some specific examples, without these being considered to limit said invention.

Example 1

This example illustrates a typical process for synthesizing the crystalline solid material containing aluminum in the network (hereinafter Al—SC) in accordance with the invention.

0.86 g of aluminum isopropoxide and 0.53 g of $GeO_2$ were dissolved in 34.42 g of N(16)-methylsparteinium hydroxide solution at a concentration of 1.53 mol/kg. 4.74 g of tetraethylorthosilicate were hydrolyzed in the solution obtained, and stirring was maintained, allowing all the alcohol formed during hydrolysis to evaporate. 0.52 g of hydrofluoric acid solution (48.1% HF by weight) was then added. The final composition of the synthesis gel was:

$0.95SiO_2:0.05GeO_2:0.02Al_2O_3:0.50ROH:0.50HF:2H_2O$ in which ROH is N(16)-methylsparteinium hydroxide.

The gel was heated at 175° C. for 5 days in steel autoclaves with a Teflon internal lining. After washing with distilled water and drying at 100° C., the Al—SC material was obtained. The Al—SC material was then subjected to a calcination step at 500° C. for 5 hours.

The chemical composition of the calcined Al—SC material synthesized by this process, expressed as % by weight of the respective oxides, was as follows:

3.4% $Al_2O_3$
90.6% $SiO_2$
6.0% $GeO_2$

Example 2

This example illustrates the preparation of a hydrocracking catalyst containing the Al—SC material obtained according to the process described in Example 1, a gamma-alumina matrix, and nickel-molybdenum as hydrogenating component, in accordance with the invention.

In a first preparation step, the Al—SC material obtained according to the process described in Example 1 was mixed with a gamma-alumina matrix (specific surface area of 122 $m^2$/g and pore volume of 0.21 $cm^3$/g) in a proportion of 1:1 by weight. The mixture was homogenized, adding distilled water until a paste formed that contained gamma-alumina and the Al—SC material in the appropriate proportions, this paste being stirred for at least 15 minutes. The mixture was then dried in an oven at 100° C. for 12 hours.

The above support consisting of a mixture of gamma-alumina and the Al—SC material was impregnated by the pore volume or "dry" impregnation method with aqueous' ammonium heptamolybdate solution. The solid obtained was dried in an oven at 100° C. for 12 hours and then calcined in a crucible furnace at 500° C. for 3 hours.

The calcined solid consisting of the support, containing a mixture of gamma-alumina and the Al—SC material, and of molybdenum oxide, was then impregnated by the pore volume method with a solution containing the required amount of nickel nitrate. The solid was then dried in an oven at 100° C. for 12 hours, followed by calcination in a crucible furnace at 500° C. for 3 hours.

The chemical composition of the catalyst prepared under these conditions, expressed as % by weight, was as follows:
11.8% $MoO_3$
3.0% NiO
42.6% γ-alumina
42.6% Al—SC material Example 3

This example illustrates the preparation of a hydrocracking catalyst containing the Al—SC material according to the invention in which the hydrogenating component was incorporated only in the gamma-alumina matrix.

First, the gamma-alumina matrix was impregnated with aqueous ammonium heptamolybdate solution by the pore volume method, the solid was dried in an oven at 100° C. and calcined in a crucible furnace at 500° C., following the same process as described in Example 2. The solid consisting of gamma-alumina and molybdenum oxide was then impregnated with aqueous nickel nitrate solution by the pore volume method, dried in an oven at 100° C., and then calcined at 500° C. under the conditions described in Example 2.

The gamma-alumina matrix containing molybdenum oxide and nickel oxide was mixed with the Al—SC material in the appropriate proportions to obtain a catalyst with the following chemical composition, expressed as % by weight:
8.3% MoO3
2.2% NiO
56.3% γ-alumina
33.2% Al—SC material Example 4

This example illustrates the activity and selectivity of a catalyst prepared according to Example 1 in accordance with the invention, for the hydrocracking of a vacuum gasoil whose main characteristics are given in Table 3.

TABLE 3

| Density (cm³/g), 20° C. | 0.83 |
| Sulfur, wt % | 2.61 |
| Nitrogen, ppm (by weight) | 1000 |
| Simulated distillation: | |
| Initial boiling point | 219 |
| 5% | 358 |
| 10% | 375 |
| 30% | 407 |
| 50% | 423 |
| 70% | 438 |
| 90% | 457 |
| 95% | 466 |

TABLE 3-continued

| Final boiling point | 489 |

The hydrocracking experiments were carried out in a continuous fixed bed reactor charged with 4.0 grams of catalyst diluted with silicon carbide up to a total volume of 14 cm³. Before the vacuum gasoil was brought into contact with the catalyst, the latter was subjected to a sulfurization step at 400° C. for 8 hours in the presence of a mixture of $H_2S$ and $H_2$ (10% by volume of $H_2S$), with a total gas flow rate of 442 cm³/min. Once the sulfurization step was completed, the vacuum gasoil was hydrocracked in the presence of hydrogen under the following reaction conditions: total pressure of 5.3 MPa, $H_2$/gasoil ratio of 1291 Nm³/m³, space velocity (WHSV) of 2.8 h$^{-1}$. The conversion was adjusted by varying the reaction temperature between 385 and 415° C.

The results regarding conversion and yields were determined after a period of stabilization of the catalyst, which was observed generally after 8-10 hours of contact between the gasoil feed and the catalyst.

The conversion was calculated as % by weight of products with a boiling point below 380° C. present in the effluent from the reactor.

To calculate the selectivities, the following boiling point ranges were considered:
Gases: <65° C.
Naphtha: 65° C.-150° C.
Kerosene: 150° C.-250° C.
Gasoil: 250° C.-380° C.

The selectivities (in wt %) for the various hydrocracking fractions were calculated as follows:

Selectivity (%)=(wt % of fraction $i$)/(wt % of 380° C. products)*100

The selectivity for medium distillates was calculated as the sum of the selectivities for kerosene and gasoil (range of boiling points between 150° C. and 380° C.).

The results regarding conversion and selectivity for the various fractions of products obtained at various reaction temperatures are shown in Table 4.

TABLE 4

|  | Reaction temperature (° C.) | | |
| --- | --- | --- | --- |
|  | 385 | 400 | 415 |
| Conversion 380° C., wt % | 42.47 | 61.36 | 78.23 |
| Selectivity, wt % Gases | 13.47 | 14.28 | 15.66 |
| Naphtha | 23.95 | 28.98 | 32.19 |
| Kerosene | 20.87 | 22.94 | 23.28 |
| Gasoil | 41.71 | 33.80 | 28.87 |
| Medium distillates | 62.58 | 56.74 | 52.15 |

Example 5

This example illustrates the activity and selectivity of a catalyst prepared according to Example 2 in accordance with the invention, for the hydrocracking of a vacuum gasoil whose main characteristics are given in Table 3.

The hydrocracking experiments were carried out in a continuous fixed bed reactor charged with 6.0 grams of catalyst diluted with silicon carbide up to a total volume of 14 cm³. Before the catalyst was brought into contact, with the vacuum gasoil, the latter was subjected to a sulfurization step at 400° C. for 8 hours in the presence of a mixture of $H_2S$ and $H_2$ (10% by volume of H$_2$S), with a total gas flow rate of 442 cm$^3$/min. Once the sulfurization step was completed, the vacuum gasoil was hydrocracked in the presence of hydrogen under the following reaction conditions: total pressure of 5.3 MPa, H$_2$/gasoil ratio of 1291 Nm$^3$/m$^3$, space velocity (WHSV) of 1.9 h$^{-1}$. The conversion was adjusted by varying the reaction temperature between 385° C. and 415° C.

TABLE 5

|  | Reaction temperature (° C.) | | |
| --- | --- | --- | --- |
|  | 385 | 400 | 415 |
| Conversion 380° C., wt % | 47.47 | 65.02 | 85.18 |
| Selectivity, wt % | | | |
| Gases | 14.94 | 18.76 | 24.73 |
| Naphtha | 17.35 | 19.50 | 25.49 |
| Kerosene | 21.79 | 24.62 | 21.96 |
| Gasoil | 45.92 | 37.12 | 57.82 |
| Medium distillates | 67.71 | 61.74 | 49.78 |

The invention claimed is:

1. A hydrocracking catalyst containing: a hydrogenating component which is selected from at least one Group VIB metal, at least one Group VIII metal, and combinations thereof, at least one matrix comprising at least one oxide which is selected from an amorphous oxide, an oxide with low crystallinity, and a mixture of both, and at least one microporous crystalline solid material which, in the calcined and anhydrous state, has the molar composition X$_2$O$_3$:nYO$_2$: mZO$_2$, in which X is a trivalent element, Y is at least one tetravalent element other than Ge, and Z is Ge, the value (n+m) is at least 5, and the value of n/m is at least 1, and which has, in its calcined and anhydrous state, an X-ray diffractogram containing at least diffraction lines with values of d=13.64, 7.87, 4.82, 4.55, 4.11 and 3.41 ang.

2. The catalyst as claimed in claim 1, wherein the trivalent element X of the microporous crystalline solid material is Al.

3. The catalyst as claimed in claim 1, wherein the Group VIB metal is selected from among molybdenum and tungsten and the Group VIII metal is selected from among iron, cobalt and nickel.

4. The catalyst as claimed in claim 1, wherein the hydrogenating component is selected from a combination of nickel-molybdenum, cobalt-molybdenum, nickel-tungsten, and nickel-cobalt-molybdenum.

5. The catalyst as claimed in claim 1, which comprises at least one acidity-promoting element.

6. The catalyst as claimed in claim 5, wherein the promoter element is selected from between phosphorus and boron.

7. The catalyst as claimed in claim 1, which comprises at least one Group VIIA element.

8. The catalyst as claimed in claim 7, wherein the Group VIIA element is fluorine.

9. The catalyst as claimed in claim 1, which has a composition, expressed as % by weight of the total weight of the catalyst, of: 0.1 to 60% of a hydrogenating component selected from at least one Group VIB metal, at least one Group VIII metal, and combinations thereof, 0.1 to 99% of microporous crystalline acid solid material, and 0.1 to 99% of at least one matrix.

10. The catalyst as claimed in claim 9, which comprises: 0 to 20% of at least one promoter element selected from between phosphorus and boron, and 0 to 20% of at least one Group VIIA element.

11. The catalyst as claimed in claim 10, wherein the Group VIIA element is fluorine.

12. The catalyst as claimed in claim 1, wherein the matrix is selected from among one or more of the following groups: alumina, silica-alumina, silica, clays, magnesium oxide, titanium oxide, boron oxide, zirconium oxide, aluminum phosphates, zirconium phosphates, carbon, and aluminates.

13. The catalyst as claimed in claim 1, wherein the matrix is gamma-alumina.

* * * * *